(12) United States Patent
Gibble et al.

(10) Patent No.: US 7,020,755 B2
(45) Date of Patent: Mar. 28, 2006

(54) METHOD AND APPARATUS FOR READ-ONLY RECOVERY IN A DUAL COPY STORAGE SYSTEM

(75) Inventors: Kevin Lee Gibble, Tucson, AZ (US); Gregory Tad Kishi, Oro Valley, AZ (US); David Lee Patterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 10/230,689

(22) Filed: Aug. 29, 2002

(65) Prior Publication Data

US 2004/0044828 A1    Mar. 4, 2004

(51) Int. Cl.
    *G06F 12/00* (2006.01)
(52) U.S. Cl. ............................ 711/162; 711/4; 711/112; 714/6
(58) Field of Classification Search ................ 711/4, 711/111, 112, 161, 162; 714/5, 6; 707/202, 707/205
    See application file for complete search history.

(56) References Cited

U.S. PATENT DOCUMENTS

| | | | |
|---|---|---|---|
| 4,755,928 A | 7/1988 | Johnson et al. ............. 364/200 |
| 5,018,060 A * | 5/1991 | Gelb et al. .................. 707/205 |
| 5,875,478 A | 2/1999 | Blumenau .................. 711/162 |
| 5,926,836 A | 7/1999 | Blumenau .................... 711/162 |
| 5,940,849 A | 8/1999 | Koyama ........................ 711/4 |
| 6,023,709 A | 2/2000 | Anglin et al. ............... 707/204 |
| 6,029,179 A | 2/2000 | Kishi .......................... 707/202 |
| 6,105,037 A | 8/2000 | Kishi .......................... 707/201 |
| 6,173,359 B1 | 1/2001 | Carlson et al. ............. 711/111 |
| 6,226,759 B1 | 5/2001 | Miller et al. .................. 714/6 |
| 6,269,423 B1 | 7/2001 | Kishi .......................... 711/113 |
| 6,269,431 B1 * | 7/2001 | Dunham ..................... 711/162 |
| 6,317,814 B1 | 11/2001 | Blendermann et al. ..... 711/162 |
| 6,336,163 B1 | 1/2002 | Brewer et al. .............. 711/112 |

* cited by examiner

*Primary Examiner*—B. James Peikari
*Assistant Examiner*—Woo H. Choi
(74) *Attorney, Agent, or Firm*—Kunzler & Associates

(57) ABSTRACT

A system, apparatus, and method to recover a logical volume on a read-only physical volume, or data storage cartridge, within a dual copy data storage system, such as a virtual tape server (VTS) system. The recovery follows a disaster situation involving the primary physical volume and the requested logical volume. The system, apparatus, and method include modules and steps as required to recover a logical volume through recalling a selective dual copy of the logical volume stored on a secondary physical volume. The primary and secondary logical volumes are stored on distinct physical volumes in order to provide quality storage media management and reduce the likelihood of loss of data. The recovery and recall procedures are implemented in a manner that is substantially transparent and asynchronous to a host or client. Additionally, the recovery and recall require no additional input from the host in order to carry out the recovery of the logical volume.

23 Claims, 5 Drawing Sheets

METHOD AND APPARATUS FOR READ-ONLY RECOVERY IN A DUAL COPY STORAGE SYSTEM

BACKGROUND OF THE INVENTION

1. The Field of the Invention

The invention relates in general to dual copy data storage systems and more particularly to the read-only recovery of a logical volume using a selective dual copy within a virtual tape server (VTS) system in a manner that is transparent to and asynchronous with a host.

2. The Relevant Art

High density, removable media storage libraries are used to provide large quantities of storage in networked computer systems. Typically, such data storage systems are employed for backup or other secondary storage purposes, but the data storage system may also be used as primary storage in circumstances that are conducive to sequential data access and the like.

The data is stored on media cartridges, such as magnetic tapes or optical disks, that are arranged in storage bins and accessed when data on a cartridge is requested. Currently available media cartridges are capable of storing much more data than the data volume units that correspond to the size of early types of media cartridges. For example, a data volume that corresponds to a 400 megabyte disk may now be stored on a disk with up to 60 gigabytes of storage capacity. Unfortunately, much legacy equipment in existing computer systems is configured for the smaller volume sizes.

Volume mapping is used to create a correlation between the physical capacity of a storage cartridge (stack volume or physical volume) and the data storage unit size (virtual volume or logical volume) of a file or block that is stored on the cartridge. Given the available data storage capacity of a single storage media cartridge, such mapping allows multiple logical volumes to be stored on a single physical volume, hence providing an efficient use of the available storage media. A virtual tape server (VTS) is one device capable of creating and maintaining such mapping among physical volumes and logical volumes.

A typical VTS system includes a virtual tape server and an automated media library. The library is controlled by a library manager that is similar to a workstation computer. Within the VTS system, typically two databases reside on separate memory disks within the system. One database resides on the virtual tape server and the other resides within the library manager.

The virtual tape server database contains the logical-to-physical volume mapping, as well as information concerning volume attributes that define actions that have been or will be taken on a logical volume each time it is closed. One of the attributes included in such information is whether a secondary copy of a logical volume was made when it was last written.

The library manager database also contains attributes associated with the logical volumes stored on the media cartridges. Included in these attributes are the construct names and associated attributes corresponding to each logical volume in the library. The library manager also controls the physical loading of media cartridges in corresponding drives by storing the physical location of the physical volumes within the storage bins and controlling a robotic accessor arm that retrieves the physical volumes from the bins and load the cartridges in the drives when a mount request is received.

Through proper communication of the volume mapping and construct attributes, a host processor and peripheral data storage equipment may access logical volumes as though they were individual physical volumes. The volume access management is provided via the virtual tape server and library manager as described above.

In certain circumstances, it may be desirable to make two copies of a single logical volume. It may also be desirable to store such copies on multiple physical volumes, such as on separate cartridges or even in separate geographic locations, so as to avoid loss due to failure of a single tape or tape drive unit. Additionally, it is desirable to provide a method of recovering the secondary copy of the logical volume if, for some reason, the primary copy becomes unavailable. Some systems and methods have been proposed to recover a secondary copy of a logical volume in a dual copy storage system. Unfortunately, a number of deficiencies exist in such known systems and methods.

For example, many known dual copy systems require an explicit command from the host to initiate recovery of a secondary copy. The software running on the host must be modified to provide the recovery command. As a result, such a recovery system may be difficult to use with existing (legacy) software. Consequently, adding recovery capability to an existing system may be rather difficult. Prior art recovery systems may also require that the host transmit the data to the virtual tape server repeatedly in order to recover the secondary copy. Thus, the I/O resources of the host are unduly taxed.

Furthermore, some dual copy systems require the host to track the locations, i.e., the physical media cartridges, of the logical volumes. This may require the maintenance of a special database on the host to hold meta data for each file stored in the virtual tape server. Again, such recovery systems are difficult or impossible to incorporate into existing host systems without providing new host software, and may unduly tax the resources of the host. Additionally, such systems may be difficult to use in a heterogeneous environment, i.e., with host computers that use different operating systems, file formats, etc.

Thus, it would be an advancement in the art to provide a virtual tape system capable of recovering a secondary copy of a logical volume in a manner that is substantially transparent to the host. It would further be an advancement in the art to provide a virtual tape system capable of efficiently recovering a logical volume independent of the host. Yet further, it would be an advancement in the art to provide a virtual tape system that minimizes the virtual tape server resources required to recover the secondary copy.

BRIEF SUMMARY OF THE INVENTION

The present invention has been developed in response to the present state of the art, and in particular, in response to the problems and needs in the art that have not yet been fully solved by currently available logical volume recovery means and methods in dual copy data storage systems. Accordingly, it is an overall objective of the present invention to provide a dual copy data storage system and apparatus, as well as a read-only recovery method that overcome many or all of the above-discussed shortcomings in the art.

To achieve the foregoing objectives, and in accordance with the invention as embodied and broadly described herein in the preferred embodiments, a system, apparatus, and method for recovering a logical volume in a dual copy storage system is presented and described herein.

The read-only recovery apparatus, in the described embodiments, is provided with a logic unit containing a plurality of modules configure to carry out the individual steps of the recovery process. These modules include an identification module, a recall module, a reconciliation module, a stripping module, and a removal module.

The read-only recovery apparatus is configured to implement a recovery action to recover a selective dual copy of a logical volume in response to a failure to access a primary logical volume. The read-only recovery apparatus may employ the identification module, the recall module, or the reconciliation module as part of the recovery operations.

The identification module is configured to identify a logical volume on a read-only physical volume. The recall module is configured to recall a selective dual copy of the logical volume on the read-only physical volume. Additionally, the recall module may be configured to recall at least one volume construct associated with the selective dual copy.

The reconciliation module is configured to update a storage manager server database to synchronize a set of volume parameters in the database with a set of attributes corresponding to the logical volume. The reconciliation module may employ the stripping module to remove active data dependencies from the first physical volume and the removal module to remove the first physical volume from a data management software inventory.

According to one embodiment, the virtual tape system includes a virtual tape server (VTS) in communication with an automated media library unit, including a plurality of tape drive units and a library manager. The VTS receives the logical or "virtual" volumes and stores them for subsequent transmittal to the host, via a storage area network (SAN), or to a plurality of physical or stack volumes via the tape drive units. The library manager controls the physical loading of physical volumes, i.e., media cartridges, into the tape drive units by controlling a robotic accessor arm that retrieves the physical volumes and loads them into the tape drive units in response to a request from the host.

The VTS has a direct access storage device (DASD) that may exist on a hard drive system, or the like, and serve as a cache for the VTS. Additionally, the VTS has a file system manager that interacts with a DASD cache to store information.

Each logical volume has one or more constructs associated with it, which are preferably received from the host. The constructs may associate certain volume management actions with specific logical volumes. The volume management actions preferably specify at least where virtual volumes are physically stored, including secondary locations if selective dual copying of the volume is to be performed.

Upon notification to the VTS that a physical volume is in read-only status, the system attempts to recover the secondary copy of the logical volume and associated construct attributes. A recovery module is employed to perform the volume recovery. The physical volume may be assigned a read-only status due to physical damage to the media cartridge or other error that prohibits full access to the stored data.

A method of the present invention is also presented for logical volume recovery when a primary physical volume is in read-only status. The method attempts to access a primary logical volume from a physical cartridge. When the VTS determines that the primary volume is inaccessible or otherwise not retrievable in its entirety, the VTS attempts to recover the selective dual copy of the requested volume stored on a secondary physical volume.

To achieve the stated recovery, the virtual tape server in one embodiment verifies the availability of a selective dual copy of the logical volume. The method also allows for verification of the status of the data on the logical volume. If the data is not active data, then it is outdated and of no use to the host and need not be recovered. If the data is active, on the other hand, the method employs a recall procedure to recall the target logical volume from the secondary physical volume. The recall procedure in one embodiment also recalls construct attributes associated with the selective dual copy of the logical volume, including a storage group construct and a management class construct.

Following the successful recall of an active selective dual copy, the method allows for reconciliation of the proper database assignment and mapping data corresponding to the removed physical volume, as well as any new location of the recovered logical volume on new primary and secondary physical volumes.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objectives of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
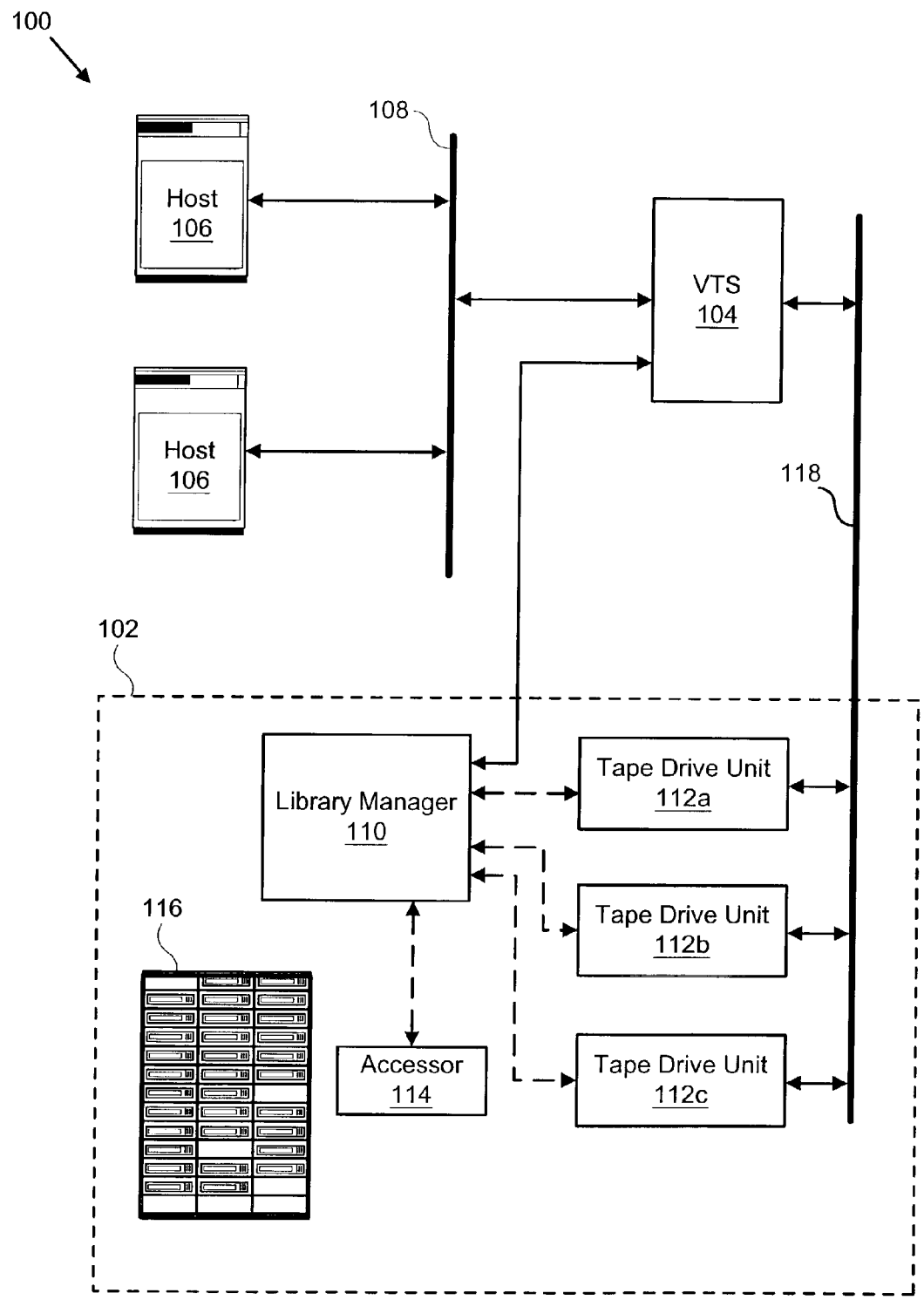
FIG. 1 is a schematic block diagram illustrating one embodiment of a representative virtual tape server (VTS) system in accordance with the prior art.

FIG. 1 illustrates a schematic block diagram of one embodiment of a representative virtual tape system 100 in accordance with the present invention. The system 100 includes an automated library unit 102, at least one virtual tape server 104, and at least one host 106. Each host 106 may be a mainframe computer. Alternatively, the host 106 may be a server or personal computer using a variety of operating systems. The host 106 and the virtual tape server 104 are connected via a storage area network (SAN) 108 or similar communications channel. The communications channel 108 in one embodiment may be a FICON or ESCON.

The automated tape library unit 102 includes a library manager 110, one or more data drive devices, which may be tape drive units 112, an accessor 114, and a plurality of media cartridges 116. The plurality of media cartridges 116 may be stored in one or more media cartridge storage bins (not identified).

The library manager 110, which includes at least one computing processor (not shown), is interconnected with, and controls the actions of, the tape drive units 112 and the accessor 114. The library manager 110 typically also includes one or more hard disk drives (not shown) for memory storage, as well as, a control panel or keyboard (not shown) to provide user input. The control panel may be a computer in communication with the library manager 110 so that a user can control the operating parameters of the automated tape library unit 102 independently of the host 106.

In FIG. 1, three tape drive units 112a, 112b, and 112c are shown. The present invention is operable with one or any larger number of tape drive units 112. The tape drive units 112 may share one single repository of cartridges 116. Alternatively, the tape drive units 112 may independently correspond to and utilize multiple repositories of cartridges 116. The tape drive units 112 may advantageously be distributed over multiple locations to decrease the probability that multiple tape drive units 112 will be incapacitated by a disaster in one location.

The interconnections between the library manager 110, the tape drive units 112, and the accessor 114 are shown as dashed lines to indicate that the library manager 110 transmits and receives control signals, rather than data to be stored or retrieved, to the tape drive units 112 and/or the accessor 114. Data for storage or retrieval may instead be transmitted directly between the virtual tape server 104 and the tape drive units 112 via a network 118, which may be a storage area network (SAN), a local area network (LAN), a wide area network (WAN), or a different type of network, such as the Internet or a direct connection between the virtual tape server 104 and the tape drive devices 112.

The accessor 114 may be a robotic arm or other mechanical device configured to transport a selected cartridge 116 between a storage bin and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 112. In alternative embodiments, the tape drive units 112 may be replaced by optical disk drives or other magnetic drives. Similarly, the cartridges 116 may contain magnetic media, optical media, or any other removable media corresponding to the type of drive employed.

Figure 2:
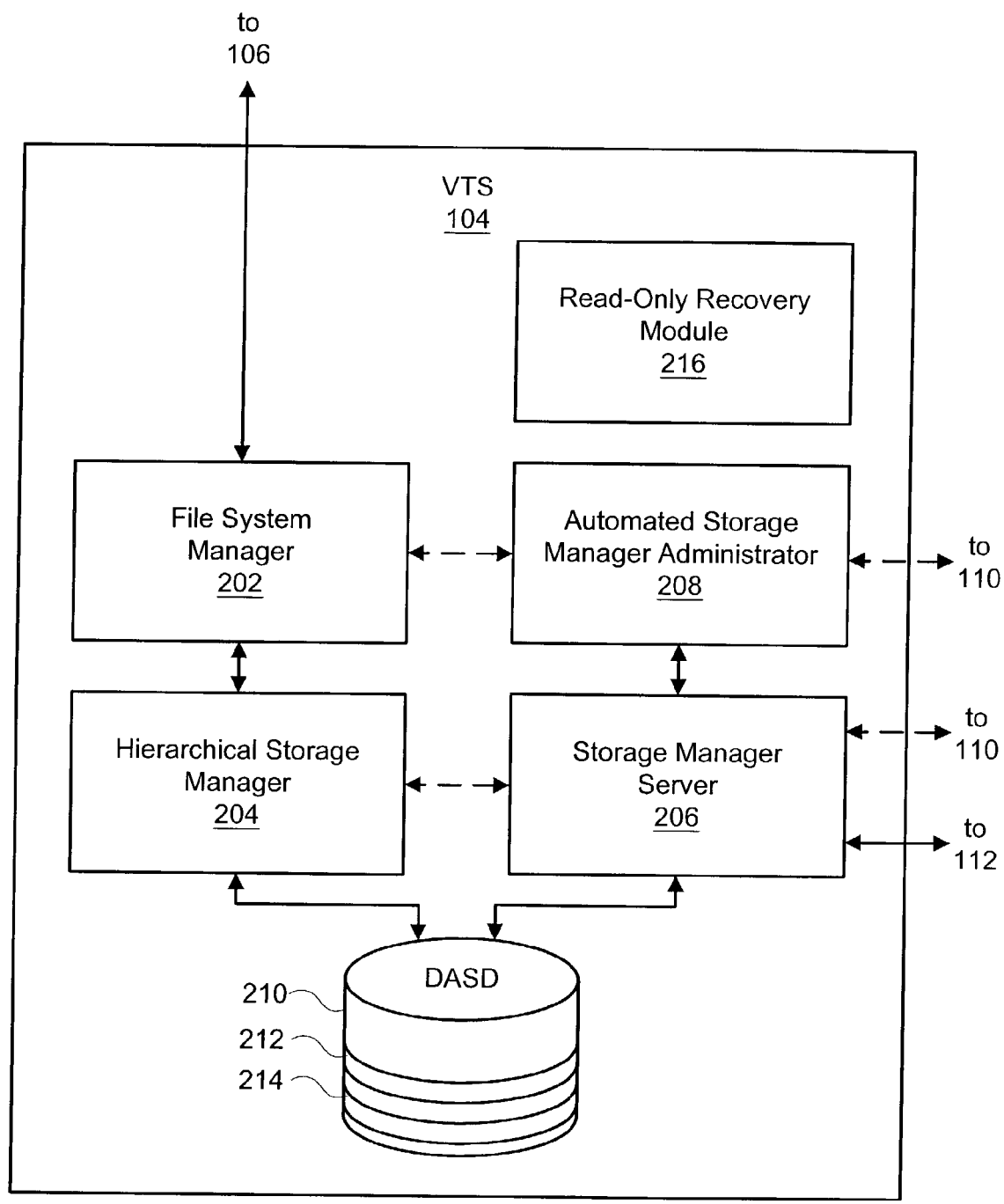
FIG. 2 is a schematic block diagram illustrating one embodiment of a representative virtual tape server suitable for use with the VTS system of FIG. 1.

FIG. 2 illustrates a schematic block diagram depicting one embodiment of the virtual tape server 104 of FIG. 1. The virtual tape server 104 may take the form of a computer with a bus, processor, memory, and the like. These elements have been omitted from FIG. 2 to more clearly depict the various executable modules and data blocks of the virtual tape server 104.

As shown, the virtual tape server 104 includes a file system manager 202, a hierarchical storage manager 204, a storage manager server 206, an automated storage manager administrator 208, and at least one direct access storage device (DASD) cache 210. The DASD cache 210 may take the form of one or more virtual tape drives to contain data in the form of a logical, or virtual, volume 212. The DASD cache 210 may also be the location where a database 214 for the storage manager server 206 is stored. Other executable modules and data blocks may also be present on the DASD cache 210, but are omitted to focus on the present invention.

The file system manager 202 handles the actual DASD 210 read and write commands from the host 106, in one embodiment, via the hierarchical storage manager 204. The storage manager server 206 controls the interface communications between the DASD 210 and the drive devices 112. The storage manager server 206 is controlled by the automated storage manager administrator 208. The automated storage manager administrator 208 monitors and directs the operation of the file system manager 202, the hierarchical storage manager 204, and the storage manager server 206, and communicates control information to and from the library manager 110.

The DASD cache 210 is used to hold a plurality of logical, or virtual, volumes 212 from the physical volumes, or memory cartridges 116. A read or write command from the host 106 is processed by the virtual tape server 104 via the DASD 210 prior to transferring the updated logical volume 212 from the DASD cache 210 to the physical volume 116.

The transfer of the updated logical volume 212 from the DASD cache 210 to a physical volume 116 may occur in a variety of ways. In one embodiment, the logical volume 212 resident on the DASD cache 210 may be the only copy of that logical volume 212. At a time determined by the virtual tape server 104, the logical volume 212 maybe premigrated to a physical volume 116. Such volume premigration provides for the virtual tape system 104 to make a copy of the logical volume 212 resident on the DASD cache 210 and store it on a physical volume 116. The principal copy of the logical volume 212 remains on the DASD cache 210 for potential accesses by the host 106.

If the host 106 does not access the logical volume 212 on the DASD cache 210 within a certain time frame, the virtual tape server 104 may decide to complete the migration of the logical volume 212 to the physical volume 116. In this instance, the virtual tape server 104 insures that the copy on the physical volume 116 is the most recent, or active, data and removes the logical volume 212 from the DASD cache 210 to provide memory for other data as required.

The virtual tape server 104 illustrated also includes a read-only recovery module 216 that is configured to recover a selective dual copy of a logical volume that is on a read-only physical volume.

Figure 3:
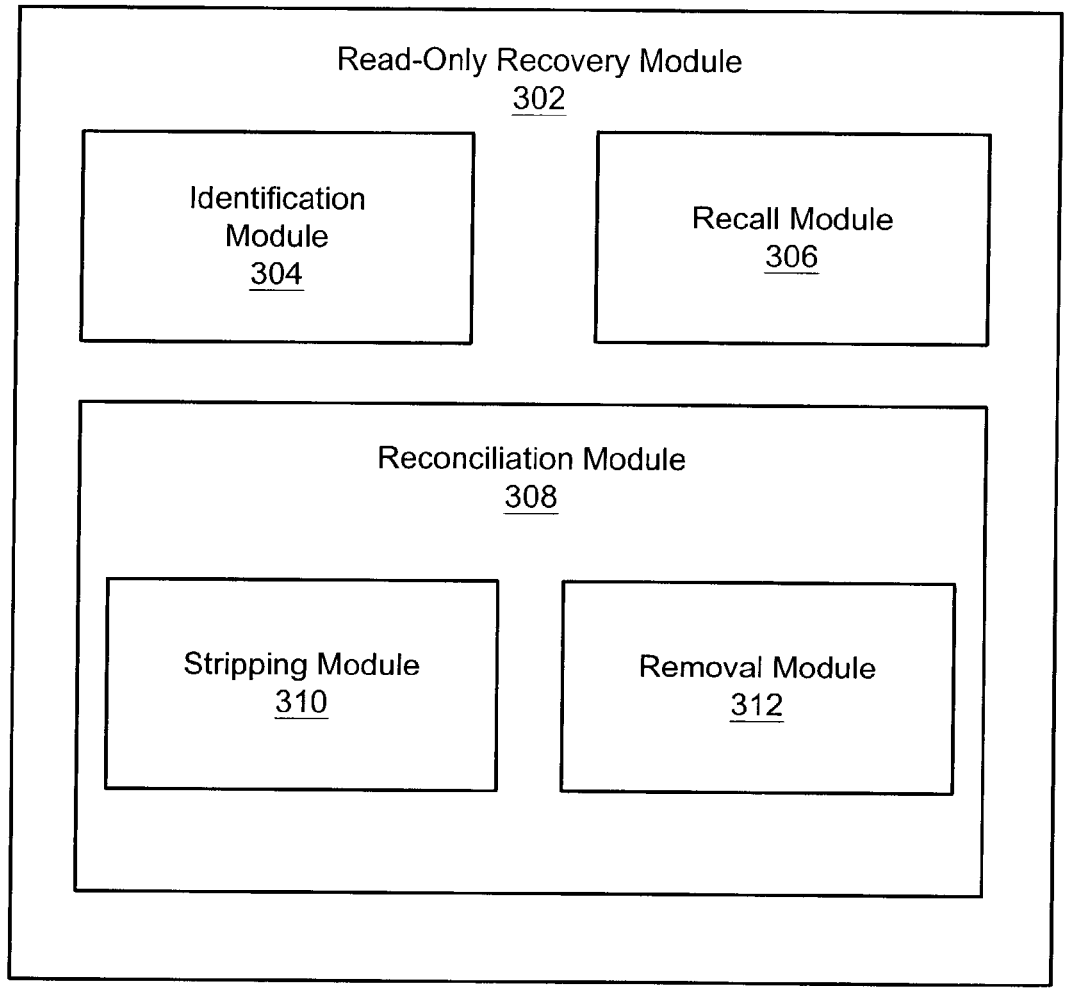
FIG. 3 is a schematic block diagram illustrating one embodiment of a representative read-only recover apparatus in accordance with the present invention.

Referring to FIG. 3, a schematic block diagram illustrates one embodiment of a read-only recovery module 302 given by way of example of a read-only recovery module 216 as shown in FIG. 2. The read-only recovery module 302 depicted includes an identification module 304, a recall module 306, and a reconciliation module 308.

The identification module 304 is configured to identify a logical volume 212 on physical volume 116. In one embodiment, the identification module 304 may be further configured to identify the location of a selective dual copy of the logical volume 212 that is located on a separate and distinct physical volume 116. The selective dual copy of the logical volume 212 may be referred to as a backup copy of the logical volume 212. Identification of these logical volumes 212, their locations on respective physical volumes 116, and attributes associated with each logical volume 212 provides the virtual tape server 104 with at least some of the information necessary to recall the selective dual copy of the logical volume 212 when the primary copy may become unavailable, either temporarily or permanently.

The recall module 306 is configured to recall the selective dual copy of the logical volume 212 to the DASD cache 212 of the virtual tape server 104 when the primary logical volume 212 is on a read-only physical volume 116 that is inaccessible. A physical volume 116 may be placed in a read-only state when the VTS system 100 is unable to access part or all of the information stored on the media cartridge 116. Such inaccessibility is very likely to be due to physical damage or wear on the cartridge 116 that may not be reparable.

The VTS system 100 may attempt to recover information from the primary physical volume 116 using multiple techniques commonly known in the preset art. Among these techniques are switching media drives 112, reverse-reading, and the like. Following this attempted recovery, the read-only recover module 302 may, in one embodiment, employ the recall module 306 to recall the selective dual copy of any or all logical volumes 212 not presently recovered from the primary physical volume 116.

The reconciliation module 308 is employed by the read-only recovery module 302 following a successful recovery of at least one logical volume 212 or portion thereof. The reconciliation module 308 in one embodiment includes a stripping module 310 and a removal module 312.

The stripping module 310 is configured to remove active data dependencies from the read-only physical volume 116 following a successful recall of at least some of the data on the physical volume 116. The removal module 312 is configured to remove reference to the physical volume 116 from which the data has been recovered from a data management software database of physical volume 116.

Figure 4:
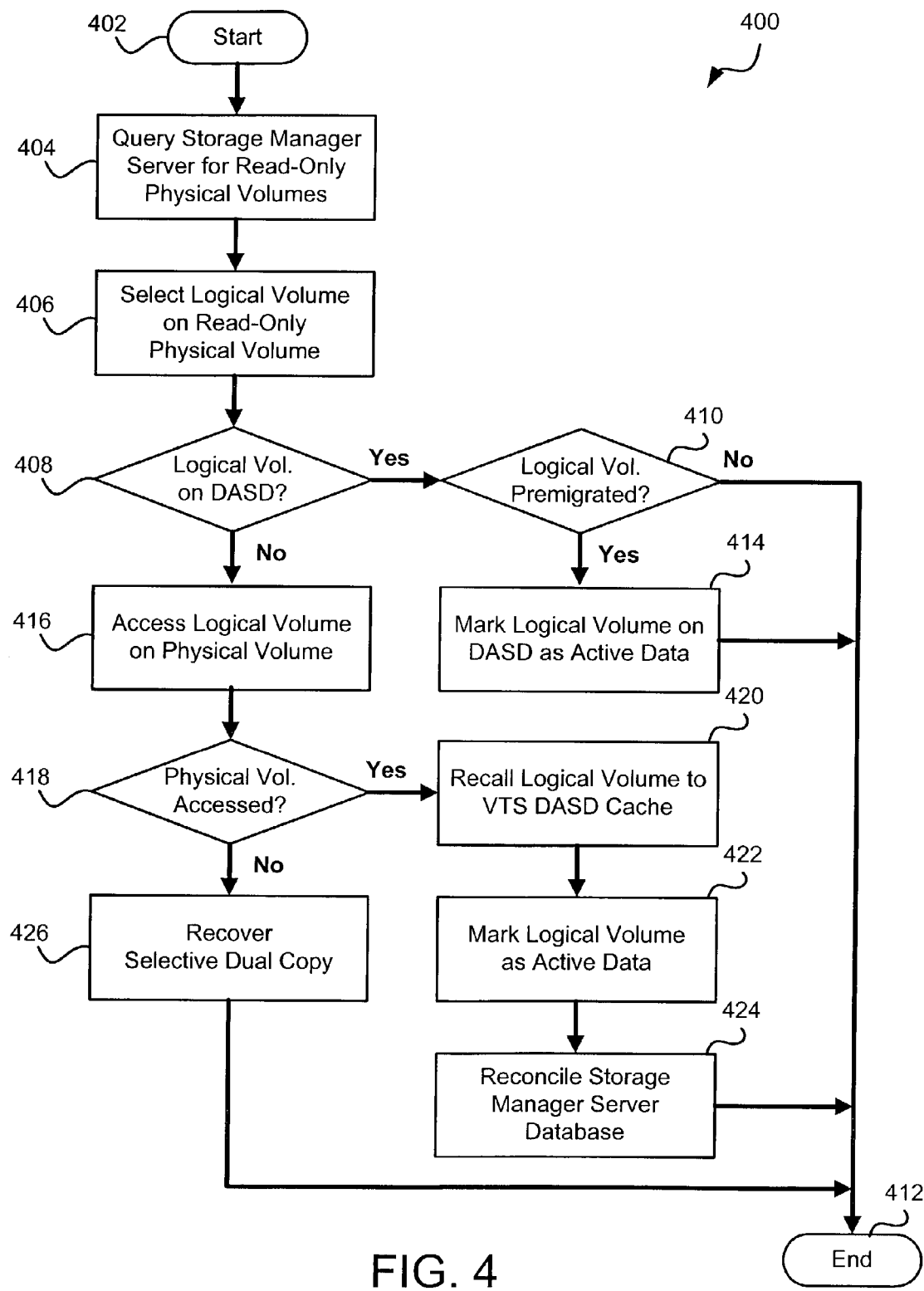
FIG. 4 is a schematic flow chart diagram illustrating one embodiment of a representative logical volume access method for use in the present invention.

Referring to FIG. 4, a schematic flowchart diagram depicts one embodiment of a logical volume access method 400 that may be employed by the VTS system 100. The method 400 starts 402 by querying 404 the storage manager server 106 within the virtual tape server 104 for a list of physical volumes 116 that are indicated as read-only. The method 400 continues with the selection of one of the read-only physical volumes 116 and further selection 406 of a logical volume stored on the selected physical volume 116. The selected logical volume 212 may be identified by a corresponding VOLSER that is unique to the logical volume 212.

Having identified a target logical volume 212 that the virtual tape server 104 attempts to access, the virtual tape server 104 in one embodiment determines 408 if a copy of the identified logical volume 212 is resident on the DASD cache 210. If a copy of the identified logical volume 212 is resident on the DASD cache 210, the virtual tape server 104 determines 410 if the logical volume 212 on the DASD cache 210 is a premigrated copy. A copy of the logical volume 212 that is not premigrated is assumed to be active data (the most recent copy of the logical volume) and the method 400 ends 412.

A copy of the logical volume 212 that is a premigrated copy may be marked 414 as an active copy. Alternately, it may be assumed that the premigrated copy of the logical volume 212 that resides on the DASD cache 210 is active data. In either case, the logical volume access method 400 ends 412.

If it is determined 408 that a copy of the target logical volume 212 is not resident on the DASD cache, the virtual tape server 104 attempts to access 416 a copy of the logical volume on the primary physical volume 116 that is indicated to be in a read-only state. If such access is determined 418 to be successful, for example if the logical volume 212 on the physical volume 116 is accessible, the virtual tape server recalls 420 the logical volume 212 or accessible portions thereof to the DASD cache 210. Any data recalled at this point is marked 422 as active data and the database 214 of the storage manager server 206 is reconciled 424 as discussed previously. The method 400 then ends 412.

If it is determined 418 that the logical volume 212 on the physical volume 116 is not accessible, the read-only recovery module 302 attempts to recover 426 the selective dual copy of the logical volume 212. The method 400 then ends 412.

Figure 5:
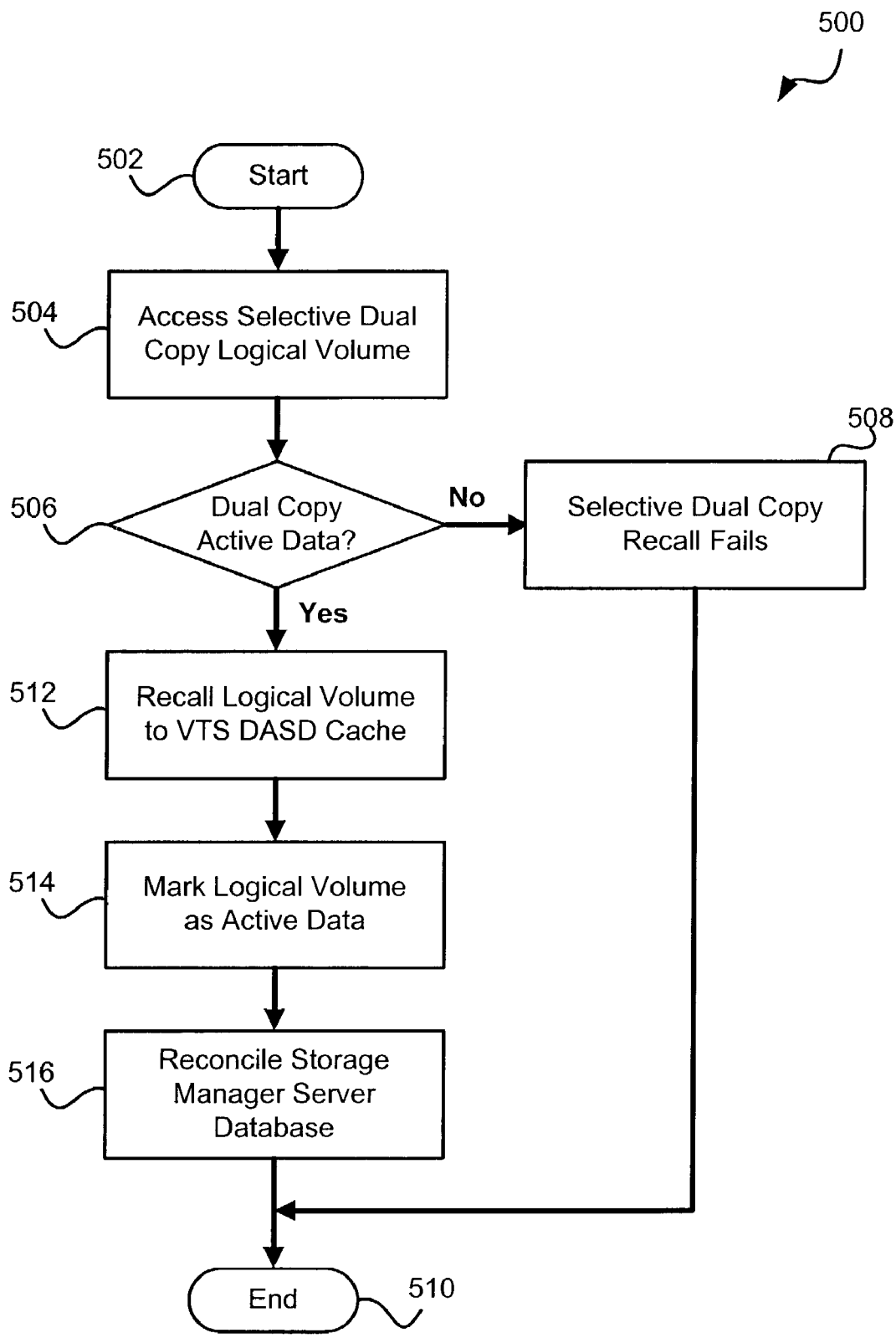
FIG. 5 is a schematic flow chart diagram illustrating one embodiment of a representative selective dual copy recovery for use in accordance with the present invention.

Referring to FIG. 5, a schematic flowchart diagram depicts one embodiment of selective dual copy recovery method 500 given by way of example of a selective dual copy recovery step 426 of FIG. 4. The method 500 begins 502 as the recall module 306 of the recovery module 302 accesses 504 the selective dual copy of the logical volume 212 on the secondary physical volume 116.

After the recall module 306 accesses 504 the selective dual copy, the recovery module 302 determines 506 if the data in the selective dual copy is active data. If it is determined 506 that the selective dual copy does not contain active data, the selective dual copy recall and recovery fails 508 and the method 500 ends 510. A selective dual copy of a logical volume 212 that does not contain active data is of no use to the host 106 because some or all of the information has been superceded by revised or new data.

If it is determined 506 that the selective dual copy does contain active data, and is therefore the data requested by the host 106, the recovery module 302 recalls 512 the selective dual copy of the logical volume 212 and stores it in the DASD cache 210 of the virtual tape server 104. The recalled logical volume 212 now residing in the DASD cache 210 is marked 514 as active data ready to be accessed by the host 106. At a time determined by the virtual tape server 104, the logical volume 212 may be premigrated or migrated to at least one physical volume 116, as described previously.

In one embodiment, at a time determined by the virtual tape server 104, the virtual tape server 104 reevaluates the constructs associated with the logical volume 212 to determine if the logical volume still requires a selective dual copy. The logical volume 212 is premigrated or migrated to at least one physical volume 116, as described previously. In some implementations, if a selective dual copy is required, the logical volume 212 is premigrated or migrated to at least one other physical volume 116, as described previously.

Once the selective dual copy of the logical volume 212 is recalled 512 and marked 514 as active data, in one embodiment, the database 214 of the storage manager server 206 is reconciled 516 in a manner similar to that of step 424 and the method 500 ends 510.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A read-only recovery apparatus configured to recover a logical volume on a physical volume, the apparatus comprising:
   a first physical volume that is in a read-only status;
   an identification module configured to identify a logical volume on the first physical volume;
   a recall module configured to recall a selective dual copy of the logical volume, the dual copy located on a second physical volume; and
   the recall module further configured to recall a volume construct associated with the logical volume, and to recover the logical volume in a manner that is made substantially transparent to a host by providing host access to the selective dual copy of the logical volume.

2. The apparatus of claim 1, further comprising a reconciliation module configured to update a storage manager server database to synchronize a set of volume parameters in the database with a set of attributes corresponding to the logical volume.

3. The apparatus of claim 2, further comprising a stripping module configured to remove active data dependencies from the first physical volume.

4. The apparatus of claim 2, further comprising a removal module configured to remove the first physical volume from a data management software inventory.

5. The apparatus of claim 1, wherein the recall module is further configured to recover the logical volume in a manner that is asynchronous with a host access to the logical volume.

6. The apparatus of claim 1, wherein the volume construct comprises a storage group construct.

7. The apparatus of claim 1, wherein the volume construct comprises a management class construct.

8. The apparatus of claim 1, wherein the second physical volume is assigned to a storage pool that is distinct from the storage pool to which the first physical volume is assigned.

9. The apparatus of claim 1, wherein the server is configured to premigrate the logical volume to a different physical volume.

10. The apparatus of claim 1, wherein the server is additionally configured to:
    re-evaluate the constructs of the logical volume;
    determine if a selective dual copy is required; and
    re-create the selective dual copy on a different physical volume.

11. A read-only recovery apparatus configured to recover a logical volume on a physical volume, the apparatus comprising:
    a first physical volume that is in a read-only status;
    an identification module configured to identify a logical volume on the first physical volume;
    a recall module configured to recall a selective dual copy of the logical volume, the selective dual copy located on a second physical volume;
    the recall module further configured to recall a volume construct associated with the logical volume;
    the recall module further configured to recover the logical volume in a manner that is made substantially transparent to a host by providing access to the selective dual copy of the logical volume, and asynchronous with a host access of the logical volume;
    a stripping module configured to remove active data dependencies from the first physical volume; and
    a removal module configured to remove the first physical volume from a data management software inventory.

12. A virtual tape server capable of making selective dual copies of a logical volume and configured to recover a logical volume on a physical volume, the server comprising:
    a memory configured to store computer code;
    the memory further configured to store active data from the logical volume;
    a read-only recovery apparatus configured to recover the selective dual copy of the logical volume and a volume construct associated with the logical volume in response to a notification that a first physical volume is in a read-only status; and
    wherein the read-only recovery apparatus is further configured to recover the logical volume in a manner that is made substantially transparent to a host by providing host access to the selective dual copy of the logical volume.

13. The server of claim 12, wherein the recovery apparatus is further configured to recover the logical volume in a manner that is transparent to a host.

14. The server of claim 12, wherein the recovery apparatus is further configured recover the logical volume in a manner that is asynchronous with a host access to the logical volume.

15. A read-only recovery method for recovering a logical volume on a physical volume, the method comprising:
    identifying a logical volume on a first physical volume that is in a read-only status;
    recalling a selective dual copy of the logical volume, the selective dual copy located on a second physical volume;
    recalling a volume construct associated with the logical volume; and
    recovering the logical volume in a manner that made is substantially transparent to a host by providing host access to the selective dual copy of the logical volume.

16. The method of claim 15 further comprising updating a storage manager server database to synchronize a set of volume parameters in the database with a set of attributes corresponding to the logical volume.

17. The method of claim 16, further comprising removing active data dependencies from the first physical volume.

18. The method of claim 16, further comprising removing the first physical volume from a data management software inventory.

19. The method of claim 15, further comprising recovering the logical volume in a manner that is asynchronous with a host access to the logical volume.

20. The method of claim 15, further comprising premigrating the logical volume to a different physical volume.

21. The method of claim 20, further comprising:
re-evaluating the constructs of the logical volume;
determining if a selective dual copy is required; and
re-creating the selective dual copy on a different physical volume.

22. A dual copy storage system capable of making a selective copy of a logical volume, the system comprising:
means for identifying a logical volume on a first physical volume that is in a read-only status;
means for recalling a selective dual copy of the logical volume, which selective dual copy is located on a second physical volume;
means for recalling a volume construct associated with the logical volume; and
means for recovering the logical volume in a manner that is substantially transparent to a host by providing host access to the selective dual copy of the logical volume.

23. A computer readable medium comprising a computer code configured to carry out a read-only recovery method for recovering a logical volume on a physical volume, the method comprising:
identifying a logical volume on a first physical volume that is in a read-only status;
recalling a selective dual copy of the logical volume in a manner that is transparent to a host, the selective dual copy located on a second physical volume;
recalling a volume construct associated with the logical volume;
updating a storage manager server database to synchronize a set of volume parameters in the database with a set of attributes corresponding to the logical volume; and
recovering the logical volume in a manner that is made substantially transparent to a host by providing host access to the selective dual copy of the logical volume.

* * * * *